United States Patent [19]

Jeon

[11] Patent Number: 5,373,439
[45] Date of Patent: Dec. 13, 1994

[54] METHOD FOR CONTROLLING THE TRAVELING PATH OF A ROBOT DURING ACCELERATION AND DECELERATION

[75] Inventor: Jae W. Jeon, Suwon, Rep. of Korea

[73] Assignee: Samsung Electronics Co., Ltd., Suwon, Rep. of Korea

[21] Appl. No.: 121,555

[22] Filed: Sep. 16, 1993

[30] Foreign Application Priority Data

Sep. 18, 1992 [KR] Rep. of Korea ............... 1992-17062

[51] Int. Cl.$^5$ ..................... G05B 19/18; G06F 15/46
[52] U.S. Cl. ......................... 364/167.01; 364/474.3
[58] Field of Search ......... 364/167.01, 474.28–474.35; 395/87–99; 318/568.11, 571, 568, 590, 569, 574, 573

[56] References Cited

U.S. PATENT DOCUMENTS

| | | | |
|---|---|---|---|
| 4,130,788 | 12/1978 | Fiegehen et al. | 318/574 |
| 4,529,921 | 7/1985 | Moribe | 318/568 |
| 4,757,457 | 7/1988 | Matsumoto | 318/571 |
| 4,912,753 | 3/1990 | Evans, Jr. | 364/167.01 |

FOREIGN PATENT DOCUMENTS

62-190505  8/1987  Japan .

Primary Examiner—Joseph Ruggiero
Assistant Examiner—Jim Trammell
Attorney, Agent, or Firm—Burns, Doane, Swecker & Mathis

[57] ABSTRACT

In order to control the movements of a robot with smooth transition type acceleration and deceleration stages, the ratios of the smooth transition type acceleration/deceleration speed command to the linear-type acceleration/deceleration speed command are calculated at each sampling time and stored in a memory portion. The robot is driven with the speed command calculated by multiplying the linear-type acceleration/deceleration speed command by the ratios stored in the memory portion for each sampling time during the driving the robot.

9 Claims, 9 Drawing Sheets

METHOD FOR CONTROLLING THE TRAVELING PATH OF A ROBOT DURING ACCELERATION AND DECELERATION

BACKGROUND OF THE INVENTION

This invention relates to a method for controlling the traveling path of a robot during its acceleration and deceleration stages and, more particularly, a method in generating a speed command for smoothly operating each shaft of a robot and for reducing the time a robot takes to produce the speed command.

In general, a robot has a plurality of shafts(commonly called "arms"). A servo motor is mounted on each of the robot's shafts. A main controller detects the operating speed of the servo motor and controls the servo motor with a control command based on the operating speed data. As stated above, the robot performs the assigned work.

In other words, in order to perform the assigned work, robot moves an end effector (normally, when a robot is operating, a working tool is inserted into the end effector) mounted on the end sector of a robot arm from one specified position to another specified position. To accomplish this, the servo motor mounted on each shaft is driven.

A method for controlling the traveling path of a robot during the acceleration and deceleration stages means than the main controller yields speed commands by the given acceleration/deceleration time, the given maximum speed axed the given distance and thereby controls the robot with the speed commands. If the produced values of the speed commands change suddenly, the robot starts and stops abruptly at the drive start point and end point, respectively. Accordingly, the robot receives mechanical impulses at each drive point.

Figure 1:
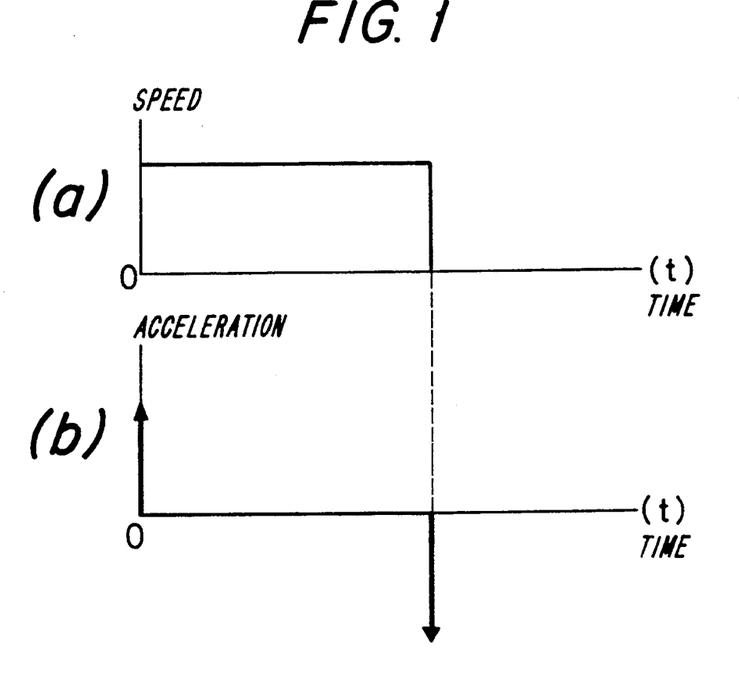
FIG. 1 is a graph showing the speed and the acceleration for an abrupt acceleration/deceleration.
Figure 2:
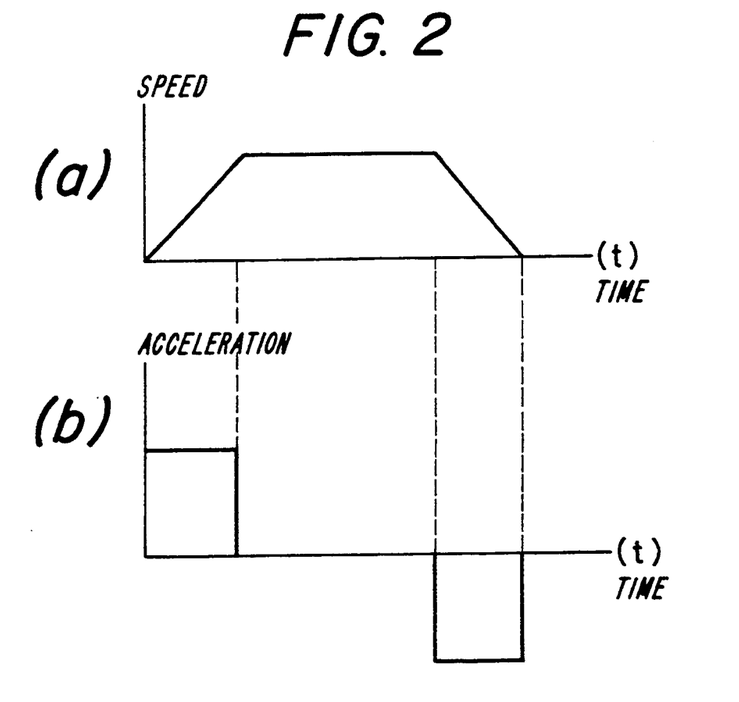
FIG. 2 is a graph showing the speed and the deceleration for a linear-type acceleration and deceleration.
Figure 3:
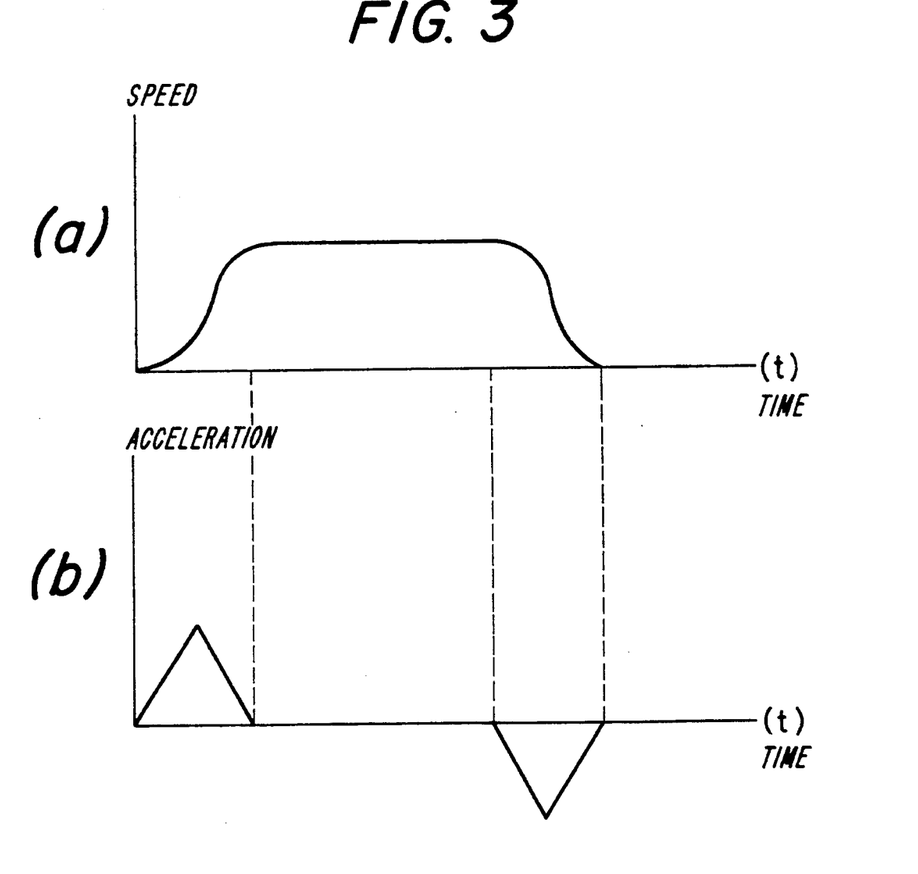
FIG. 3 is a graph showing the speed and the acceleration for a smooth transition type acceleration/deceleration.

If a rectangular-type acceleration/deceleration speed command as shown in FIG. 1 or a linear-type acceleration/deceleration speed command as shown in FIG. 2 is given, because there is a portion at which the acceleration varies abruptly and irregularly, the robot starts and stops abruptly, so that its body is subjected to an unreasonable excessive force.

In order to prevent this unreasonable force, a speed command for controlling the robot with smooth acceleration and deceleration is needed.

Figure 4:
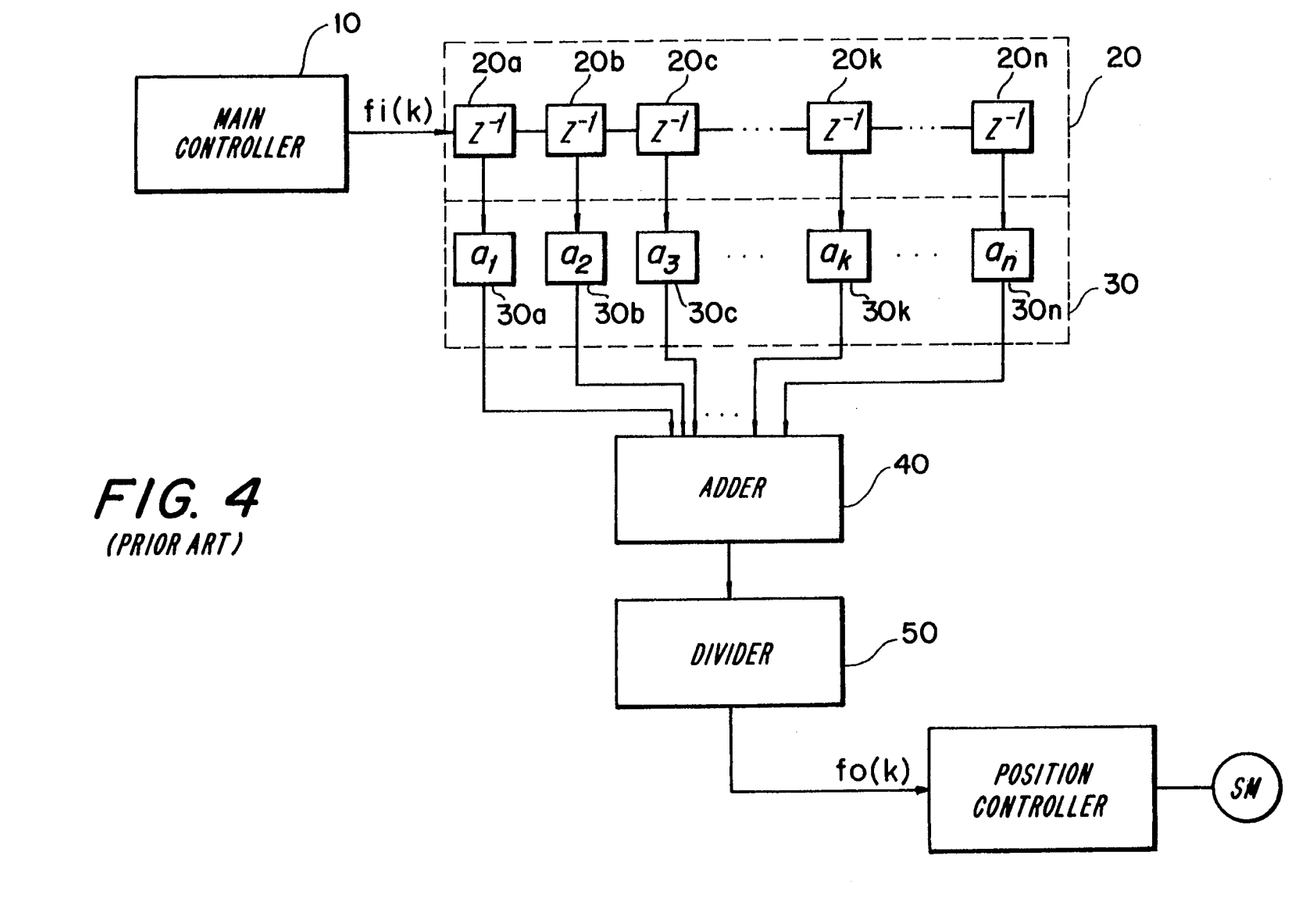
FIG. 4 is a block diagram of a prior position control apparatus performing a smooth transition type acceleration/deceleration.

A prior-art apparatus for producing smooth acceleration/deceleration speed commands with hardware is showing in FIG. 4. In FIG. 4, shift registers $20a-20n$ store drive path components. The drive path components move from one shift register to the next. Multipliers $30a-30n$ multiply the data stored in the shift registers $20a-20n$ by coefficients $a1-an$. An adder 40 totals the results of the multiplier 30. The divider 50 divides the result obtained by the adder 40 by the sum of the coefficients $a1-an$. The speed command obtained through the process described above is calculated as follows:

At each sampling time, the speed commands are $$f_0(k) = \left( 1 / \sum_{p=1}^{k} a_p \right) \sum_{p=1}^{k} a_p \cdot f_i(k - p + 1) \quad (1)$$

$a_p$: coefficient, $f_i(k)$: speed command

If the equation (1) is normalized with $\Sigma a_p = 1$, $$f_0(k) = \sum_{p=1}^{k} a_p \cdot f_i(k - p + 1) \quad (2)$$

is obtained.

Accordingly, if each value of $a_p$ is different in the equations (1) and (2), many multiplying and adding arithmetic operations are needed in order to calculate the traveling distance for each sampling time, so it takes a long time to control the robot and its hardware is complicated.

A typical prior-art for controlling the acceleration and deceleration stage is disclosed at Japanese Laid Number Sho 62-190505.

This invention utilizes previous interpolation position data for controlling the continuous traveling path, stores the data in a memory portion and controls the robot by using the stored data. It controls the robot path with the interpolation position data at each interpolation point thereby attaining very precise control. Also, it differs from the present invention in its ability to control a robot with a smooth phase of acceleration and deceleration.

Accordingly, the present invention was invented to solve this problem and an object of the present invention is to supply a method for controlling the drive path of a robot with speed commands making acceleration and deceleration smooth.

Another object of the present invention is to provide a method for controlling the drive path of a robot which will greatly reduce the time required to produce speed commands which make the acceleration and deceleration stages smooth.

In order to achieve the above-stated objects, a method according to the present invention stores previously yielded ratios of smooth acceleration/deceleration speed commands to linear acceleration/deceleration speed commands stored in the memory portion, produces a linear acceleration/deceleration speed command for every sampling time and multiplying the result by said recorded ratios to a servo motor and thereby performing a smooth acceleration/deceleration.

DESCRIPTION OF THE PREFERRED EMBODIMENTS

Embodiments of the present invention will be hereinafter described in detail with reference to the accompanying drawings.

Figure 5:
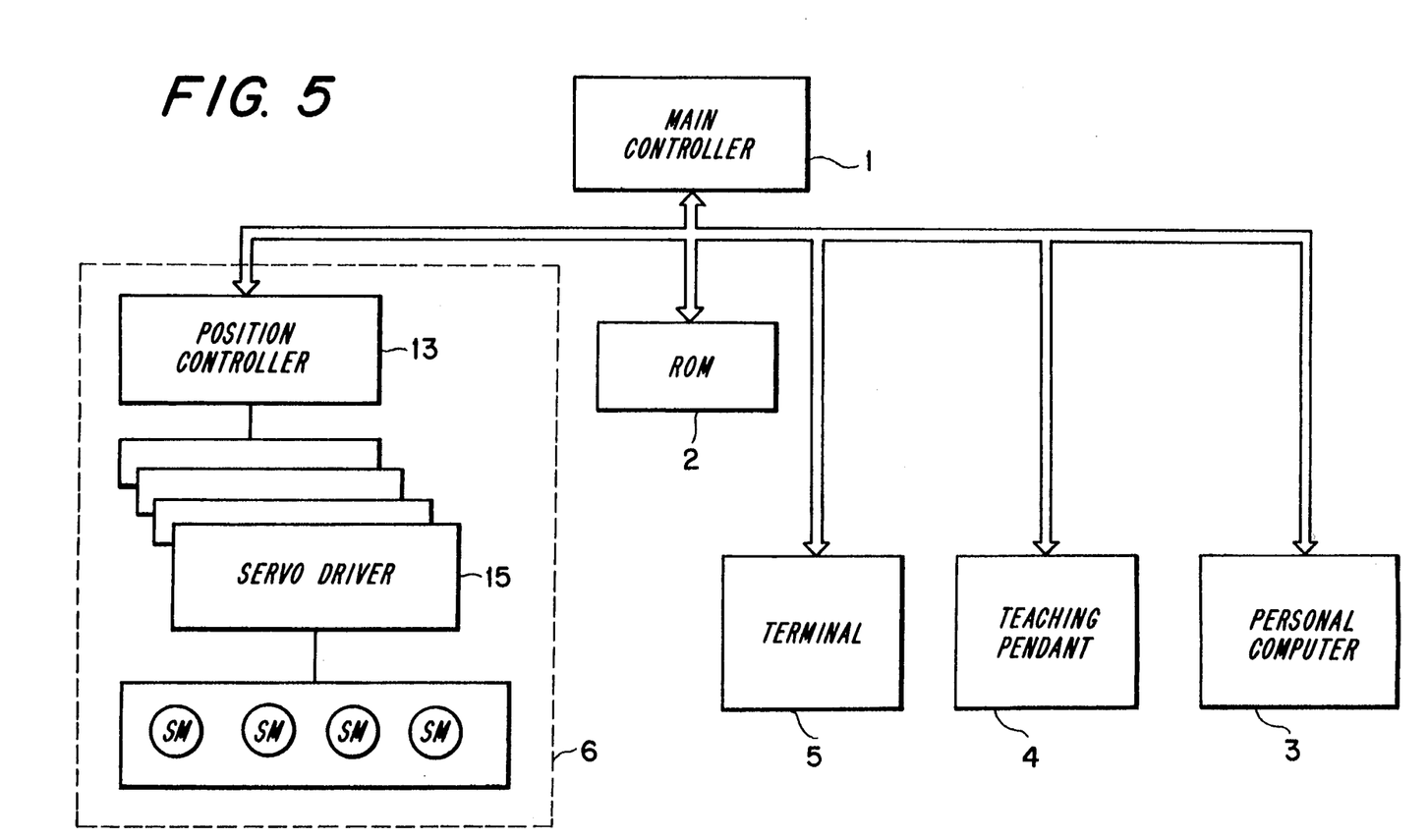
FIG. 5 is a block diagram of a robot system applied to the embodiment according to the present invention.
Figure 6:
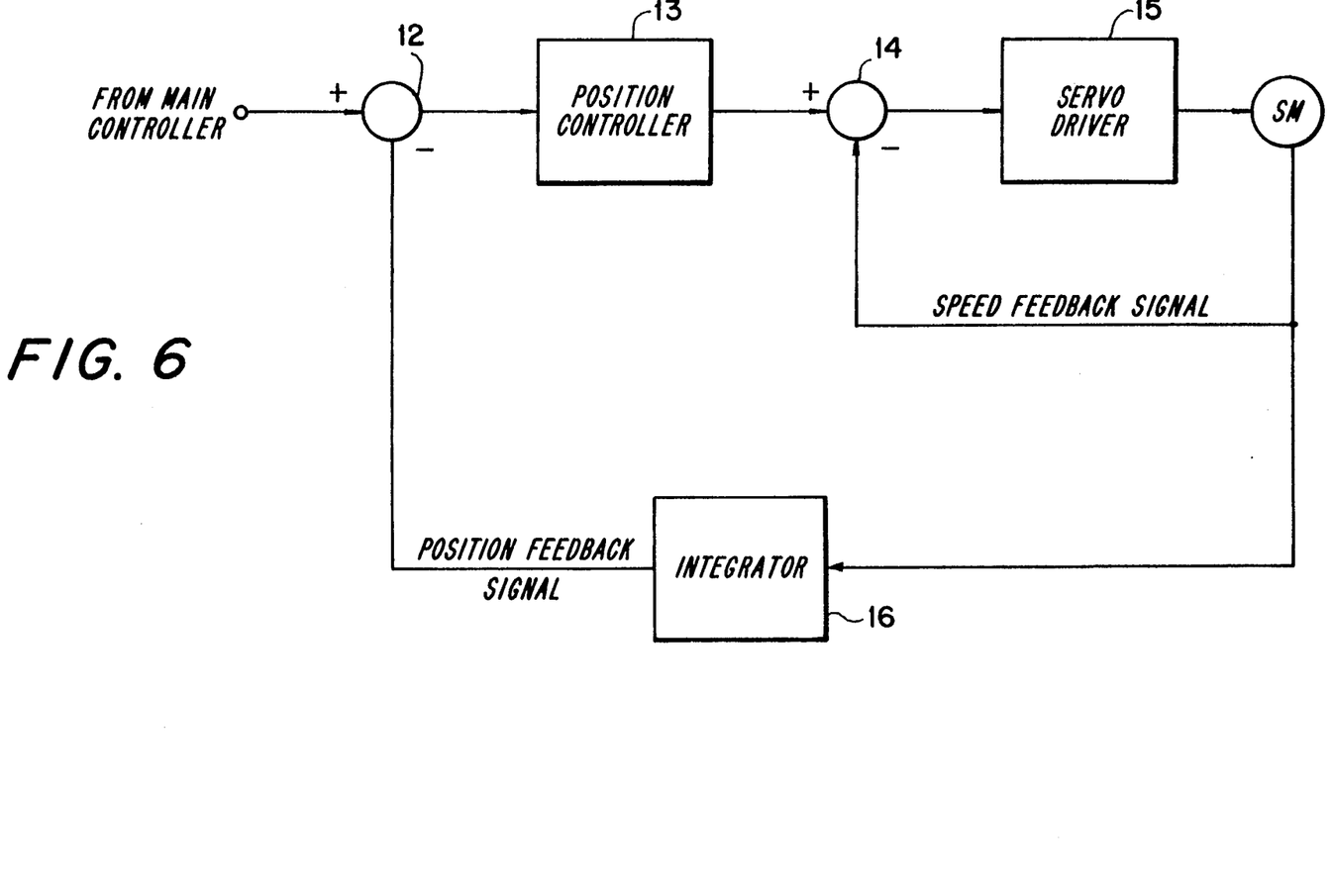
FIG. 6 is a block diagram of a position control apparatus.

In FIG. 5 and FIG. 6, a main controller 1 controls the operation of a robot. A personal computer 3 is used by a user to write the robot operation program and to save or back up the control program stored in a ROM 2 (described below). A computer terminal 5 is used by an user to write an operation instruction program. A teaching pendant 4 indicates an attaining position as a desired position and converts the teaching position to a figure. The ROM 2 stores the written program which performs the user's operation commands. A position control apparatus 6 controls the position of the robot according to the speed commands which the main controller 1 outputs based on the control program stored in the ROM 2.

In FIG. 6, the position control apparatus 6 receives the position control signal and outputs the signal compensation position of the robot. The output signal is converted to a speed control command by the position controller 13. A second arithmetic unit 14 receives the current speed signal from the servo motor SM and calculates the sum of the output from the position controller 13 and the current speed signal. A servo driver 15 receives the output from the second arithmetic unit 14 and drives the servo motor SM.

The present invention produces the speed command described below in order to reduce the arithmetic frequency required to produce the speed command $f_0(k)$ each sampling time.

Figure 7:
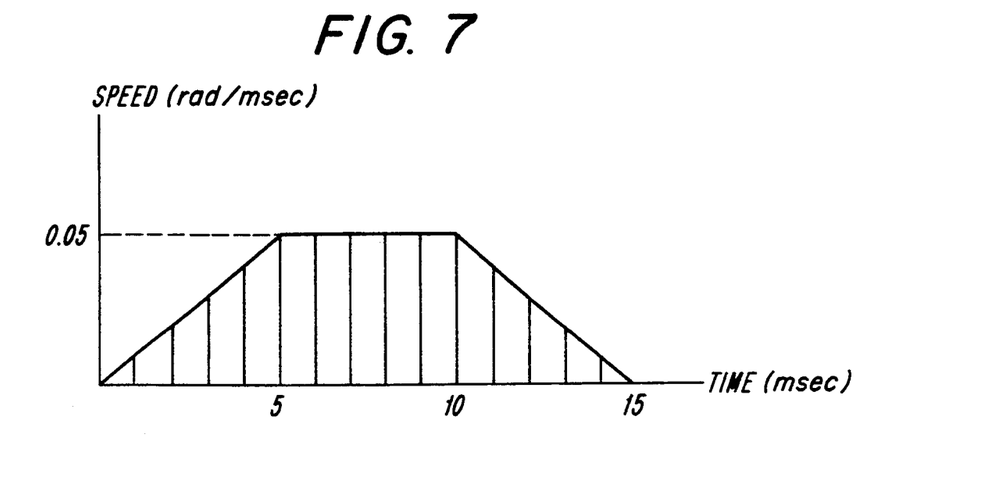
FIG. 7 is a graph showing the speed divided into sampling sections for a linear-type acceleration/deceleration.

For example, when the sampling time Ts is 1 msec, the maximum speed Vmax is 0.05 rad/msec, the acceleration time and the deceleration time are each 5 msec, the moving distance D is 0.5 rad, the linear acceleration/deceleration speed waveform is shown in FIG. 7 and is obtained as follows:

Because the time Te for generating the speed command is $Te=D/Vmax+Ta=0.5/0.05+5=15$ msec, the speed at each sampling time are obtained:

$V(1)=0.01$ rad/msec$=1\times V(1)$
$V(2)=0.02$ rad/msec$=2\times V(1)$
$V(3)=0.03$ rad/msec$=3\times V(1)$
$V(4)=0.04$ rad/msec$=4\times V(1)$
$V(5)=V(6)=V(7)=V(8)=V(9)=V(10)=0.05$ rad/msec$=5\times V(1)=$Vmax
$V(11)=0.04$ rad/msec$=4\times V(1)$
$V(12)=0.03$ rad/msec$=3\times V(1)$
$V(13)=0.02$ rad/msec$=2\times V(1)$
$V(14)=0.01$ rad/msec$=1\times V(1)$
$V(15)=0.00$ rad/sec The required traveling distance at each sampling time is obtained:

$L(1)=0.01/2$ rad$=0.005$ rad$=1\times L(1)$
$L(2)=(0.01+0.02)/2$ rad$=0.015$ rad$=3\times L(1)$
$L(3)=(0.02+0.03)/2$ rad$=0.025$ rad$=5\times L(1)$
$L(4)=(0.03+0.04)/2$ rad$=0.035$ rad$=7\times L(1)$
$L(5)=(0.04+0.05)/2$ rad$=0.045$ rad$=9\times L(1)$
$L(6)=L(7)=L(8)=L(9)=L(10)=0.05$ rad$=10\times L(1)$
$L(11)=(0.04+0.05)/2$ rad$=0.045$ rad$=9\times L(1)$
$L(12)=(0.03+0.04)/2$ rad$=0.035$ rad$=7\times L(1)$
$L(13)=(0.02+0.03)/2$ rad$=0.025$ rad$=5\times L(1)$
$L(14)=(0.01+0.02)/2$ rad$=0.015$ rad$=3\times L(1)$
$L(15)=0.01/2$ rad$=0.005$ rad$=1\times L(1)$.

Figure 8:
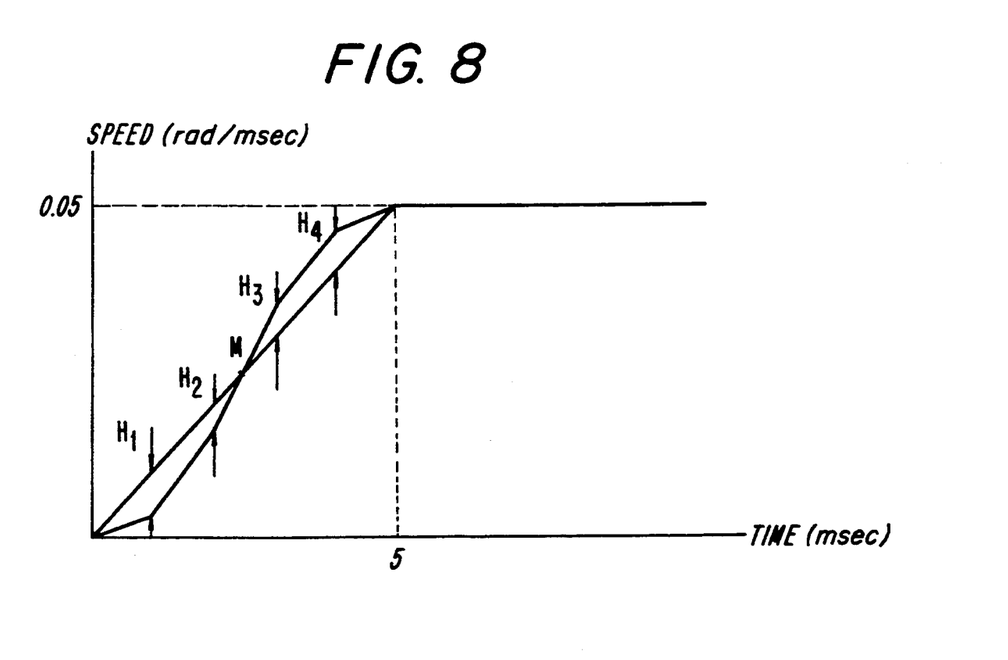
FIG. 8 is a graph showing a speed driven with a smooth transition type acceleration according to the present invention.

Thereafter, as shown in FIG. 8, a smooth transition type acceleration speed graph at acceleration is as follows(the deceleration method is the same):

When the acceleration/deceleration time is divided into an odd number of sampling frequencies, the smooth transition type acceleration/deceleration speed graph is symmetrically centered at point M where it intersects with the linear-type acceleration/deceleration speed command graph. When the difference in distance between the two graphs is H1 at the first sampling point, H2 at the second sampling point, H3 at the third sampling point and H4 at the fourth sampling point, $H1=H4=0.008$ and $H2=H3=0.01$, so that the two shaded areas of W1 and W2 are equal to each other as shown FIG. 9.

Figure 9:
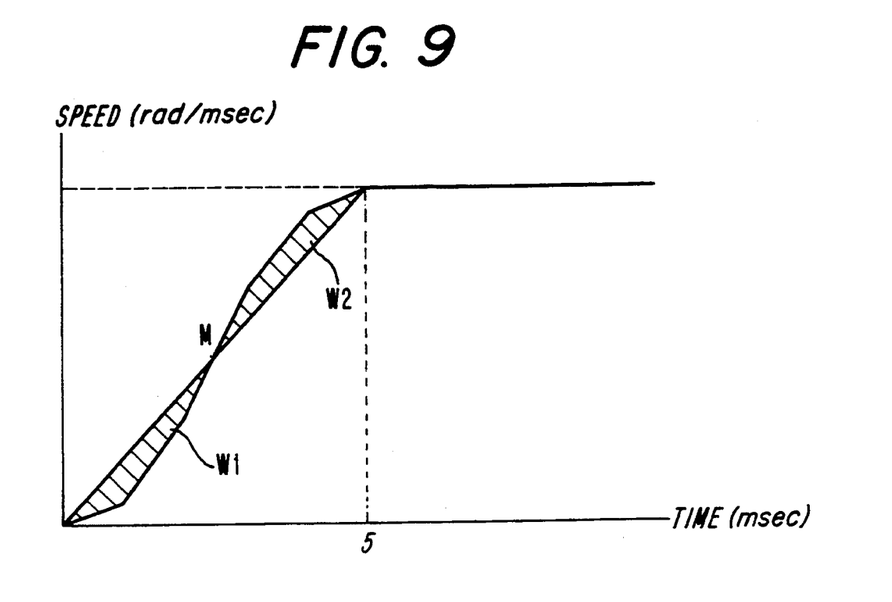
FIG. 9 is a graph showing the relation of the speed according to the present invention and the speed during a linear accelerating stage.

Thus, as shown in FIG. 9, because the two shaded areas W1 and W2 are equal to each other, the traveling distance of a robot driven by the smooth transition type acceleration/deceleration speed command according to the present invention is equal to that of a robot driven by the linear-type acceleration/deceleration speed command.

In order to actually produce the smooth transition type acceleration/deceleration speed command, the ratios of the smooth transition type acceleration/deceleration speed command to the linear-type acceleration/deceleration speed command at each sampling time are previously stored in the memory portion(generally, in ROM). After the linear-type acceleration/deceleration speed command is produced, the smooth transition type acceleration/deceleration speed command is produced by multiplying the previously produced linear-type acceleration/deceleration speed command by the ratios snored in the memory portion.

Because the ratios stored in the memory portion are $r1=0.2$, $r2=0.5$, $r3=1.25$, $r4=1.16$, $r5=1$, the linear-type acceleration/deceleration speed command is calculated by the sampling time $Ts=1$ msec, the maximum speed $Vmax=0.05$ rad/msec, the acceleration time and deceleration time $Ts=0.5$ msec and the target distance $D=0.05$ rad, the smooth transition type acceleration/deceleration command is calculated as follows:

At each sampling time, the required speeds are $V(1)=0.2\times 0.01$ rad/msec$=0.002$ rad/msec
$V(2)=0.5\times 0.02$ rad/msec$=0.010$ rad/msec
$V(3)=1.25\times 0.03$ rad/msec$=0.0375$ rad/msec
$V(4)=1.16\times 0.04$ rad/msec$=0.0464$ rad/msec
$V(5)=V(6)=V(7)=V(8)=V(9)=V(10)=1\times 0.05$ rad/msec$=$Vmax
$V(11)=1.16\times 0.04$ rad/msec$=0.0464$ rad/msec
$V(12)=1.25\times 0.03$ rad/msec$=0.0375$ rad/msec
$V(13)=0.5\times 0.02$ rad/msec$=0.010$ rad/msec
$V(14)=0.2\times 0.01$ rad/msec$=0.002$ rad/msec V(15)=0.00 rad/msec.

Figure 10:
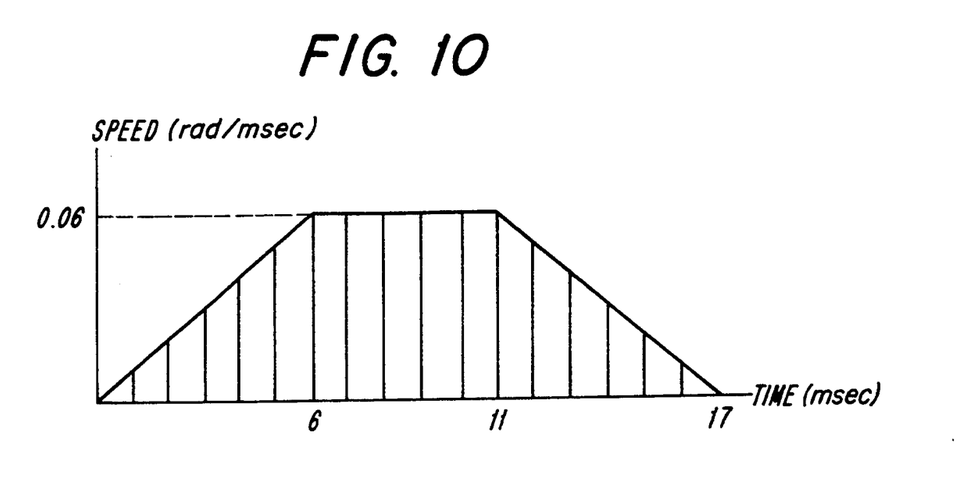
FIG. 10 is a graph showing an other embodiment of the speed divided into sampling section for a linear-type acceleration/deceleration.
Figure 11:
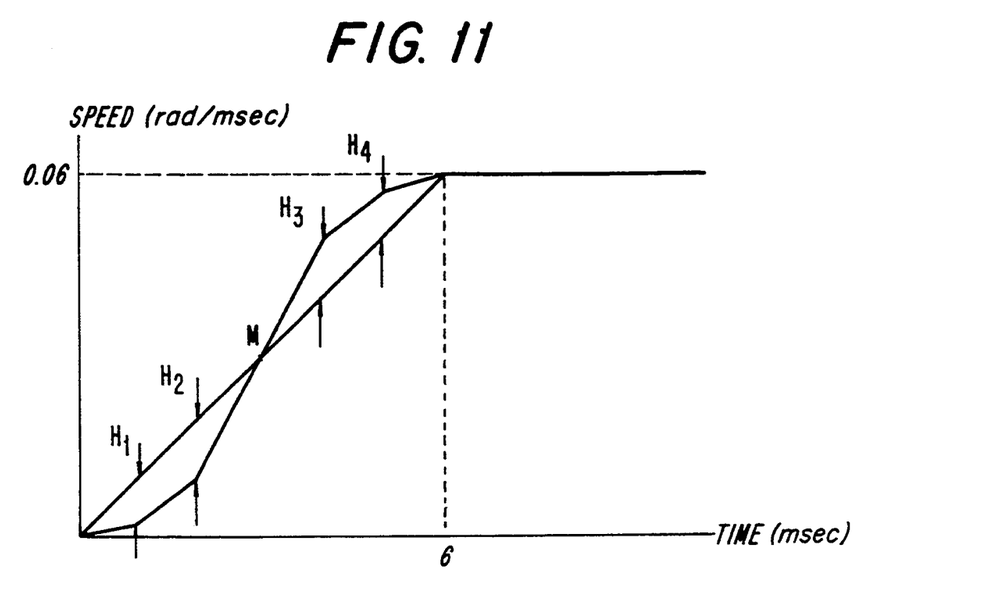
FIG. 11 is a graph showing the difference between the smooth transition type acceleration speed and the linear-type acceleration speed produced at other embodiment of the present invention.

As another embodiment, when the sampling time Ts=1 msec, the maximum speed Vmax=0.06 rad/msec, the acceleration/deceleration time Ta=6 msec, the target distance D=0.66 rad, the liner-type acceleration/deceleration speed command is able to attain the linear-type acceleration/deceleration speed as shown in FIG. 10 which is calculated as follows:

Because the time Te generating the speed command is Te=D/Vmax+Ta=0.66/0.06+6=17 msec, the speed at each sampling time is calculated:

V(1)=0.01 rad/msec=1×V(1)
V(2)=0.02 rad/msec=2×V(1)
V(3)=0.03 rad/msec=3×V(1)
V(4)=0.04 rad/msec=4×V(1)
V(5)=0.05 rad/msec=5×V(1)
V(6)=V(7)=V(8)=V(9)=V(10)=V(11)=0.06 rad/msec=6×V(1)=Vmax
V(12)=0.05 rad/msec=5×V(1)
V(13)=0.04 rad/msec=4×V(1)
V(14)=0.03 rad/msec=3×V(1)
V(15)=0.02 rad/msec=2×V(1)
V(16)=0.01 rad/msec=1×V(1)
V(17)=0.00 rad/msec As shown in FIG. 11, the process for obtaining the smooth transition type acceleration/deceleration speed graph is described as follows:

When the acceleration time and the deceleration time are divided into even numbered sampling frequencies, the middle sampling point of the accelerating interval on the linear-type acceleration graph is set at the point where the smooth transition type acceleration/deceleration speed graph intersects the linear-type acceleration/deceleration graph. Accordingly, the smooth transition type acceleration/deceleration speed graph is symmetrically centered at point M where it intersects with the linear-type acceleration/deceleration speed graph. When the difference in distance between the two graphs is H1 at the first sampling point, H2 at the second sampling point, intersection point M at the third sampling point, H3 at the forth sampling point and H4 at the fifth sampling point, the ratios of H1=H4 and H2=H3 are evident as shown in FIG. 11.

Here, the sampling frequency is greater or less than that above, but when it is greater, the speed changes are smoother.

Figure 12:
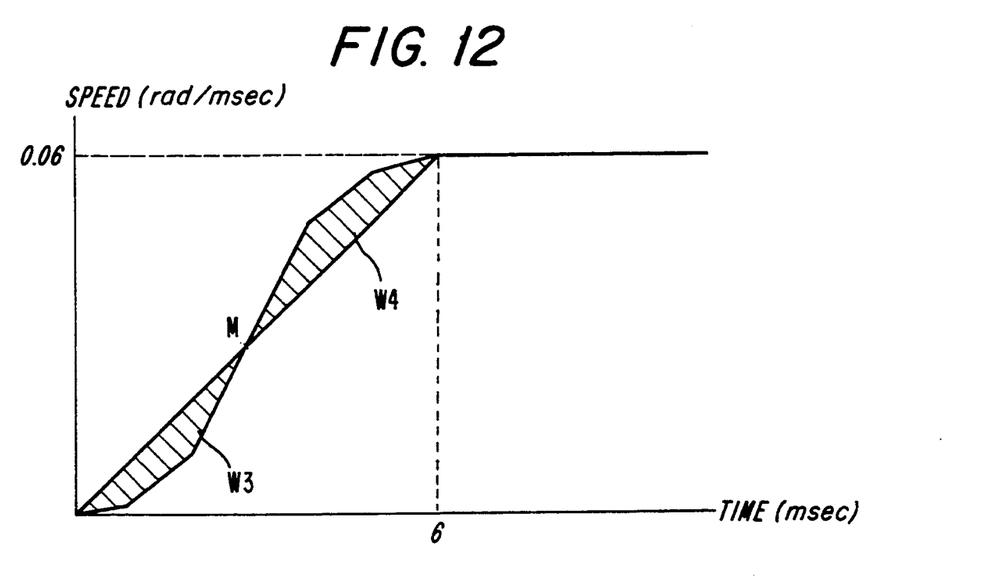
FIG. 12 is a graph showing the relation of the speed according to the invention and the speed of a linear-type acceleration at the other embodiment of the present invention.

Because the two shaded parts W3 and W4 are equal to each other as shown in FIG. 12, the traveling distance of a driven by the smooth transition type acceleration/deceleration speed command according to the present invention is equal of a robot driven by the linear-type acceleration/deceleration speed command as shown in FIG. 10.

At this time, the ratios for the smooth transition type acceleration/deceleration speed command to the linear-type acceleration/deceleration for every sampling time are previously stored in the memory portion(generally, in ROM). After the linear-type acceleration/deceleration command is calculated, the smooth transition type acceleration/deceleration speed command is calculated by multiplying the previously produced linear-type acceleration/deceleration speed command by the rates stored in the memory portion.

Also, the method according to the present invention is applied to the speed command when the acceleration time is non only equal to but also different from the deceleration time.

Because the ratios stored in the memory portion are r1=0.2, r2=0.5, r3=1, r4=1.25, r5=1.16 and r6=1, in the sampling time Ts=1 msec, the maximum speed Vmax=0.06 rad/msec, the acceleration time and deceleration time Ta=6 msec and the target distance D=0.66 rad, the smooth transition type acceleration/deceleration command is calculated as follows:

V(1)=0.2×0.01 rad/msec=0.002 rad/msec
V(2)=0.5×0.02 rad/msec=0.010 rad/msec
V(3)=1 ×0.03 rad/msec=0.03 rad/msec
V(4)=1.25×0.04 rad/msec=0.05 rad/msec
V(5)=1.16×0.05 rad/msec=0.058 rad/msec
V(6)=V(7)=V(8)=V(9)=V(10)=V(11)=1×0.06 rad/msec=Vmax
V(12)=1.16×0.05 rad/msec=0.058 rad/msec
V(13)=1.25×0.04 rad/msec=0.05 rad/msec
V(14)=1 ×0.03 rad/msec=0.03 rad/msec
V(15)=0.5×0.02 rad/msec=0.010 rad/msec
V(16)=0.2×0.01 rad/msec=0.002 rad/msec
V(17)=0.00 rad/msec.

Figure 13:
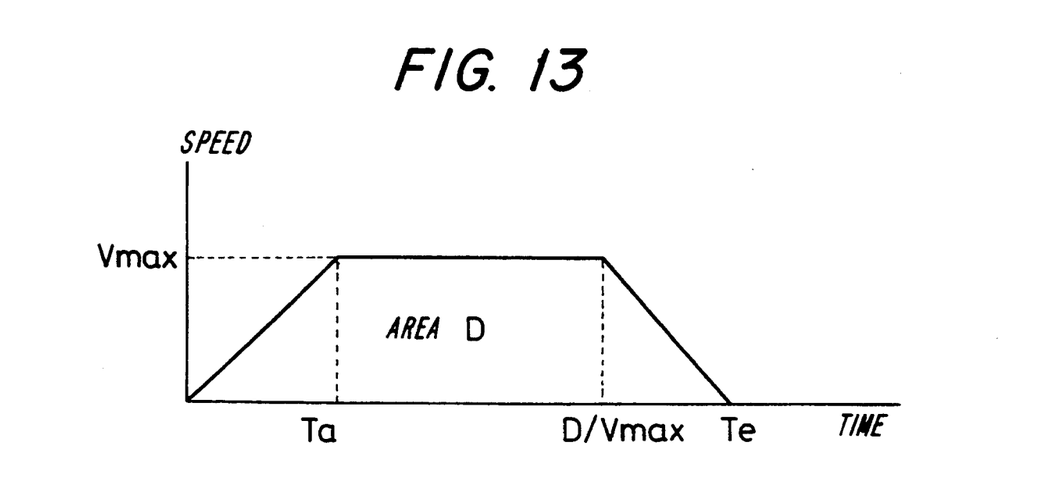
FIG. 13 is a graph showing the speed of a linear-type acceleration/deceleration used in the present invention.

The method for controlling the acceleration/deceleration of a robot is briefly described as follows:

If the sampling time Ts, the maximum speed Vmax, the acceleration/deceleration speed Ta, and the target position D is given, the linear-type acceleration/deceleration speed waveform is obtained as shown in FIG. 13.

At this time, the time Te generating speed command is Te=D/Vmax+Ta, $$\text{speed command } V_{01}(k) = \begin{cases} (V\text{max} \cdot Ts/Ta) \cdot k, & (k \leq Ta/Ts) \\ V\text{max}, & (Ta/Ts < k \leq D/V\text{max}) \\ V\text{max} - (V\text{max} \cdot Ts/Ta) \cdot \\ \quad (k - D/V\text{max}), & (D/V\text{max} < k \leq D/V\text{max} + Ta/Ts) \end{cases}$$

Figure 14:
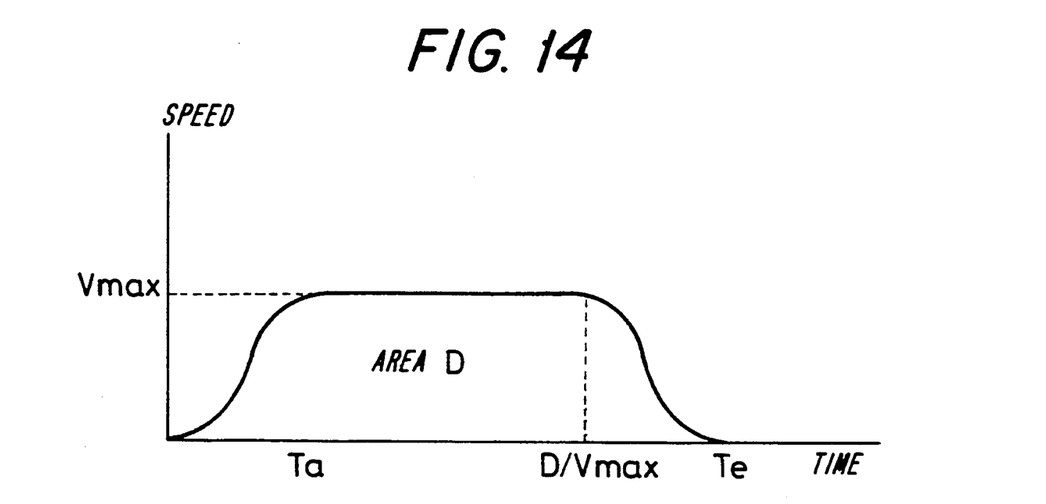
FIG. 14 is a graph showing the speed of smooth transition type acceleration/deceleration phase produced according to the present invention.

Then, as shown in FIG. 14, the smooth transition type acceleration/deceleration speed waveform is produced as above described. That is to say, because the rates corresponding to the sampling time are stored in the memory portion, the smooth transition type acceleration/deceleration is calculated by multiplying the linear-type acceleration/deceleration speed command by the rates corresponding to the sampling time. The equation describing this process is as follows:

$$V_{02}(k) = \begin{cases} r(k) \cdot V_{01}(k), & (k \leq Ta/Ts) \\ r(k - D/V\text{max}) \cdot V_{01}(k), & \\ & (D/V\text{max} < k \leq D/V\text{max} + Ta/Ts) \end{cases}$$

As stated above, the embodiment of the present invention describes the case when the acceleration time and the deceleration time is the same. However, the method according to the present invention is capable of being applied when the acceleration time is different from the deceleration time.

A method according to the present invention produces the smooth speed command control of a robot and thereby prevents strong impulses from being applied to the body of the robot. Therefore, it has the beneficial effect of not only preventing damage to the robot but also greatly reducing the time needed for the robot to take to produce the speed command.

What is claimed is:

1. A method for controlling a speed of a robot traveling along a path including a main controller, a position controller means and a servo motor for driving the robot in response to smooth speed commands applied from the main controller to the position controller means, the method comprising the steps of:

producing ratios of a smooth transition type acceleration/deceleration speed command to a linear-type acceleration/deceleration speed command for a predetermined time;

storing previously the ratios in a memory portion before driving the robot;

producing the linear-type acceleration/deceleration speed command for the predetermined time during driving of the robot; and calculating the smooth speed commands by multiplying the linear speed command by the ratios stored in the memory portion.

2. A method for controlling the traveling path of a robot of claim 1, wherein:

said predetermined time is the sampling time at every point where a speed command is obtained.

3. A method for controlling the traveling path of a robot of claim 1, wherein:

a graph of said smooth transition type acceleration/deceleration speed command is symmetrically centered on the point where said smooth transition type acceleration/deceleration speed command intersects with it graph of the linear-type acceleration/deceleration speed command.

4. A method for controlling the traveling path of a robot of claim 1, further comprising the step of controlling the traveling path of the robot in accordance with the smooth speed commands.

5. A method for controlling a speed of a robot traveling on a path including a main controller, a position controller means and a servo motor for driving the robot in response to speed commands applied from the main controller to the position controller, the method comprising the steps of:

producing the first ratios of a smooth transition type acceleration speed command to a linear-type acceleration speed command at every predetermined time;

producing second ratios of a smooth type deceleration speed command to a linear-type deceleration speed command at predetermined times;

storing said first and second ratios in a memory portion before driving the robot;

producing the linear-type acceleration speed command at every predetermined time during driving of the robot:

producing the speed command by multiplying the linear-type acceleration speed command by the first ratios stored in the memory portion;

producing the linear-type deceleration speed command at every predetermined time during driving of the robot; and producing the speed command by multiplying the linear-type deceleration speed command by the second ratios stored in the memory portion.

6. A method for controlling the traveling path of a robot of claim 5, wherein:

said predetermined time is the sampling time at every point where a speed command is produced.

7. A method for controlling the traveling path of a robot of claim 5, wherein:

slope of a linear-type acceleration speed graph is different from that of a linear-type deceleration speed graph.

8. A method for controlling the traveling path of a robot of claim 4, further comprising the step of controlling the traveling path of the robot in accordance with the smooth speed commands.

9. A method for producing smooth speed commands for a robot traveling on a path during driving of the robot to provide smooth acceleration/deceleration of the robot and for controlling the robot comprising the steps of:

producing ratios of smooth transition speed commands to respective linear speed commands for a predetermined period of time;

storing said ratios in a memory before driving the robot;

producing linear speed commands during a driving time of the robot;

determining said smooth speed commands by multiplying said linear speed commands by said stored ratios; and controlling the robot in accordance with said smooth speed commands.

* * * * *